(12) United States Patent
Morita et al.

(10) Patent No.: US 10,767,787 B2
(45) Date of Patent: Sep. 8, 2020

(54) ELECTRICALLY-DRIVEN FLOW RATE CONTROL VALVE

(71) Applicant: Kobe Steel, Ltd., Hyogo (JP)

(72) Inventors: Kei Morita, Kobe (JP); Naoki Sugano, Kobe (JP); Satoshi Maekawa, Kobe (JP); Takayuki Igaue, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/440,416

(22) Filed: Jun. 13, 2019

(65) Prior Publication Data

US 2020/0011444 A1 Jan. 9, 2020

(30) Foreign Application Priority Data

Jul. 9, 2018 (JP) ................................. 2018-130108

(51) Int. Cl.
 *F16K 31/40* (2006.01)
 *G05D 7/06* (2006.01)
 *F25B 41/06* (2006.01)

(52) U.S. Cl.
 CPC ............ *F16K 31/406* (2013.01); *F25B 41/06* (2013.01); *G05D 7/0635* (2013.01)

(58) Field of Classification Search
 CPC ...... F16K 31/406; F25B 41/06; G05D 7/0635
 USPC ...................... 251/30.01, 30.02, 30.03, 30.04
 See application file for complete search history.

(56) References Cited

U.S. PATENT DOCUMENTS

| | | | | |
|---|---|---|---|---|
| 2,020,833 A * | 11/1935 | Hansen | ................. | F16K 31/408 251/30.04 |
| 4,679,765 A * | 7/1987 | Kramer | ................. | F15B 13/015 251/38 |
| 5,048,790 A * | 9/1991 | Wells | ................. | F16K 31/408 251/30.04 |
| 5,906,352 A * | 5/1999 | Post | ................. | F16K 27/029 251/30.02 |
| 6,328,275 B1 * | 12/2001 | Yang | ................. | F16K 31/406 137/487.5 |
| 7,621,211 B2 * | 11/2009 | Ma | ................. | E02F 9/2207 251/30.04 |
| 8,424,836 B2 * | 4/2013 | Ma | ................. | F16K 31/406 251/30.03 |
| 8,870,152 B2 * | 10/2014 | Nagata | ................. | F16K 31/408 251/30.04 |

(Continued)

FOREIGN PATENT DOCUMENTS

| | | |
|---|---|---|
| JP | 2007-239996 A | 9/2007 |
| JP | 2013-130271 A | 7/2013 |

*Primary Examiner* — Umashankar Venkatesan
(74) *Attorney, Agent, or Firm* — Studebaker & Brackett PC

(57) ABSTRACT

Provided is an electrically-driven flow rate control valve capable of controlling a flow rate of a fluid flowing between two inlet/outlet ports, restraining a high pressure of the fluid from being applied to a sub valve body connected to an electric motor. The flow rate control valve has a casing, a raising/lowering drive device, a supply-switching valve, a main valve body, a valve-closing spring. When the electric motor of the raising/lowering drive device moves the sub valve body upward, oil of a back pressure chamber is discharged from a discharge oil passage through a sub valve body communication port and a sub valve body oil passage to open the main valve body. When the main valve body is closed, a pressure of the back pressure chamber is inhibited from being directly applied to a lower end face of the sub valve body.

8 Claims, 8 Drawing Sheets

(56) References Cited

U.S. PATENT DOCUMENTS

2007/0210270 A1    9/2007  Stephenson et al.
2007/0290151 A1*  12/2007  Muller ............... G05D 16/2097
                                                    251/26
2007/0290152 A1*  12/2007  Ma ....................... F16K 31/406
                                                    251/30.01

* cited by examiner

F I G. 1
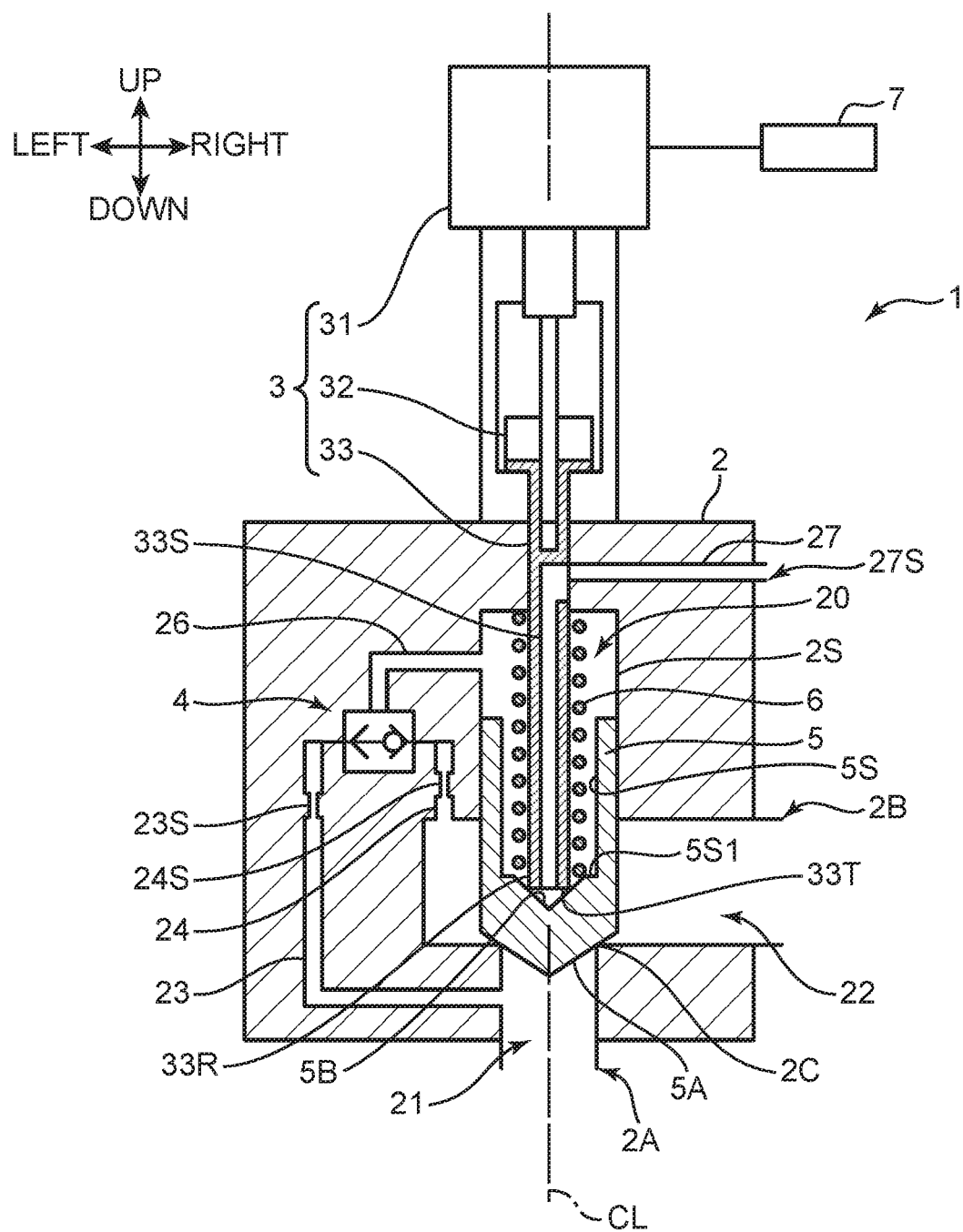

ELECTRICALLY-DRIVEN FLOW RATE CONTROL VALVE

BACKGROUND OF THE INVENTION

Field of the Invention

The present invention relates to au electrically-driven flow rate control valve capable of controlling a flow rate of a fluid which flows between two inlet/outlet ports.

Description of the Related Art

Conventionally, those known as controlling a flow rate of an operating fluid in a flow passage of the operating fluid such as operating oil and refrigerant, have been electrically-driven flow rate control valves. An electrically-driven flow rate control valve is provided with a casing, a main valve body which is movable within the casing, a driving source which generates a driving power for moving the main valve body, and a sub valve body which receives the driving power of the driving source and transmits a moving force to the main valve body. In the casing, a first inlet/outlet port and a second inlet/outlet port are formed, and these inlet/outlet ports communicate with each other through a communication flow passage. The main valve body is configured to be movable between a blocking position for blocking the communication flow passage and an unblocking position for unblocking the communication flow passage.

JP 2013-130271 A discloses an electric valve as an electrically-driven flow rate control valve as described above. The electric valve is provided with a valve main body, a valve body, a raising/lowering drive mechanism, and a valve-closing spring. The valve main body has a valve chamber, a horizontal first inlet/outlet port which opens in the valve chamber, a vertical valve port with a valve base which opens in the valve chamber, and a second inlet/outlet port which follows the valve port. The valve body is distributed in the valve chamber so as to be able to be raised/lowered to open/close the valve port. The raising/lowering drive mechanism has an electric motor for raising/lowering the valve body. The valve-closing spring urges the valve body to a valve-opening direction. The valve port is configured to have a port diameter substantially equal to a chamber diameter of a back pressure chamber which is defined above the valve body; and the valve body is provided inside with a pressure-equalized passage having a lower end face open so that the valve port and the back pressure chamber communicate with each other. Dimension of each part is set such that a value obtained by dividing an area of the lower end opening of the pressure-equalized passage by an area of the valve port becomes 0.5 or more and less than 1.0.

JP 2007-239996 A discloses a pilot operated valve. The valve is provided with a body, a main poppet valve, a pilot piston, a first disk spring, a pilot valve element, and an actuator. The body has a first port, a second port, and a valve seat arranged between the first port and the second port. The main poppet valve selectively engages the valve seat to form a control chamber. The pressure of the control chamber controls the movement of the main poppet valve. The main poppet valve has an aperture which makes the second port and the control chamber communicate with each other. The pilot piston is movably received in the aperture of the main poppet valve, and has a pilot passage there through. The first disk spring biases the pilot piston away from the main poppet valve. The pilot valve element operates to open/close the pilot passage. The actuator is operably coupled to move the pilot valve element.

In the case of the electric valve of JP 2013-130271 A, it is necessary to keep the valve body at a predetermined position by a driving force generated by an electric motor. Therefore, when a pressure of a fluid flowing between the first inlet/outlet port and the second inlet/outlet port rises, a driving force to keep the valve body is increased proportionally to the pressure. As a result, there has been a problem that a large electric power is required in keeping the valve body. On the other hand, in the case of the pilot operated valve described in JP 2007-239996 A, a position of the pilot valve element is controlled by the first disk spring and the actuator. Therefore, a positional accuracy of the valve element tends to fluctuate due to a hysteresis of an equipment such as a spring or an actuator. Moreover, depending on a direction of a flow of oil, when the valve is closed, a pressure of the oil of the first inlet/outlet port or the second inlet/outlet port directly acts on the pilot valve element. Therefore, there has been a problem that the actuator requires a large driving force in keeping the pilot valve element in a valve-close state, which increases electric power consumption.

The present invention has been accomplished in view of the problems, and has an object of providing an electrically-driven flow rate control valve capable of controlling a flow rate of a fluid which flows between two inlet/outlet ports, with restraining a high pressure of the fluid from being applied to a sub valve body connected to an electric motor.

SUMMARY OF THE INVENTION

The electrically-driven flow rate control valve according to one aspect of the present invention is provided with a casing having a first fluid chamber, a second fluid chamber, a fluid chamber communication port which makes the first fluid chamber and the second fluid chamber communicate with each other, and a cylinder unit, wherein: a first inlet/outlet port which allows a fluid to flow in/out therethrough between an outside of the casing and the first fluid chamber, and a second inlet/outlet port which allows a fluid to flow in/out therethrough between the outside of the casing and the second fluid chamber, are formed in the casing; an electric motor; a main valve body having a main valve body tip portion capable of sealing the fluid chamber communication port, which is housed in the cylinder unit in a movable manner between a main valve body unblocking position and a main valve body sealing position, along a predetermined axial direction, and forms a back pressure chamber between the cylinder unit and itself which allows the fluid to flow therein/therefrom, wherein the main valve body tip portion allows a circulation of the fluid between the first fluid chamber and the second fluid chamber, by unblocking the fluid chamber communication port, when the main valve body is located in the main valve body unblocking position, and the main valve body tip portion blocks the circulation of the fluid between the first fluid chamber and the second fluid chamber, by sealing the fluid chamber communication port, when the main valve body is located in the main valve body sealing position; an urging mechanism which urges the main valve body towards the main valve body sealing position; a first communication passage capable of making the first fluid chamber and the back pressure chamber communicate with each other; a second communication passage capable of making the second fluid chamber and the back pressure chamber communicate with each other; a switching mechanism capable of changing a state between a first communication state which allows the circulation of the fluid in the first communication passage, and blocks the circulation of the fluid in the second communication passage, when a pressure of the fluid in the first fluid chamber is higher than a pressure of the fluid in the second fluid chamber, and a second communication state which allows the circulation of the fluid in the second communication passage, and blocks the circulation of the fluid in the first communication passage, when the pressure of the fluid in the first fluid chamber is lower than the pressure of the fluid in the second fluid chamber; a first flow rate adjusting mechanism which is located in the first communication passage and adjusts a flow rate of the fluid so as to lower the flow rate of the fluid flowing from the first fluid chamber towards the back pressure chamber; a second flow rate adjusting mechanism which is located in the second communication passage and adjusts a flow rate of the fluid so as to lower the flow rate of the fluid flowing from the second fluid chamber towards the back pressure chamber; a sub valve body housed in the back pressure chamber, the sub valve body having a sub valve body flow passage which communicates with the outside of the casing, and a sub valve body communication port which makes the back pressure chamber and the sub valve body flow passage communicate with each other, the sub valve body being movable relatively to the main valve body, along the axial direction, between a sub valve body unblocking position and a sub valve body sealing position by receiving a driving force generated by the electric motor, the sub valve body unblocks the sub valve body communication port when the sub valve body is located in the sub valve body unblocking position, to allow the fluid of the back pressure chamber to be discharged to the outside of the casing through the sub valve body flow passage, and the sub valve body seals the sub valve body communication port when the sub valve body is located in the sub valve body sealing position to block the circulation of the fluid between the back pressure chamber and the sub valve body flow passage, and to allow the main valve body to receive an urging force of the urging mechanism, to locate the main valve body in the main valve body sealing position.

According to the present structure, it is possible to control a position an opening/closing operation) of the main valve body at a high accuracy, by controlling a position of the sub valve body by the electric motor. In addition, the first flow rate adjusting mechanism and the second flow rate adjusting mechanism are distributed in the first communication passage and the second communication passage. Therefore, a high pressure of the first fluid chamber or the second fluid chamber is restrained from being directly applied to the sub valve body, and a pressure necessary to drive the main valve body is supplied to the back pressure chamber. As a result, it is not necessary to drive the sub valve body against the high pressure, and the electric motor only needs to generate a driving force to move the sub valve body relative to the main valve body. This realizes an electric power saving, an output saving, and a downsizing of the electrically-driven flow rate control valve. In addition, the switching mechanism is capable of automatically selecting a high pressure side of the first fluid chamber and the second fluid chamber, and supplying the fluid to the back pressure chamber for an opening/closing operation of the main valve body. This allows easily controlling fluid flow in both directions between the first inlet/outlet port and the second inlet/outlet port, without the need of providing a plurality of direction-switching valves for supply of the fluid to the back pressure chamber.

In the above structure, it is desirable that the fluid chamber communication port have a circle shape when viewed along the axial direction, and the main valve body tip portion have a conical shape capable of sealing the fluid chamber communication port, along the axial direction.

According to the structure, it is possible to stably inhibit a flow-in/out of the fluid throughout in the circumferential direction of the main valve body tip portion, by driving the main valve body such that the main valve body tip portion enters in the fluid chamber communication port.

In the above structure, it is desirable that the main valve body have an inner space formed into a tubular form along the axial direction and communicates with the back pressure chamber at the opposite side from the main valve body tip portion, the inner apace allows the sub valve body to enter therethrough; and an inner wall tip portion which defines a side of the main valve body tip portion of the inner space; and it is desirable that the sub valve body have a cylindrical portion located at least in an end portion in the side of the inner wall tip portion, the sub valve body communication port be opened on the cylindrical portion, the inner wall tip portion have a concave portion which allows the cylindrical portion of the sub valve body to enter therein, and comes in close contact with the cylindrical portion entirely in the circumferential direction.

According to the present structure, it is possible to inhibit a discharge of the fluid from the back pressure chamber to the sub valve body flow passage, by entering the cylindrical portion of the sub valve body into the concave portion of the main valve body. In addition, since the sub valve body communication port opens in the cylindrical portion of the sub valve body, the pressure of the back pressure chamber is hard to be applied to the sub valve body communication port. This restrains a large electric power consumption in keeping the position of the sub valve body at a time of valve-closing.

In the above structure, it is desirable that the sub valve body communication port open in the sub valve body, on an end face thereof which intersects the axial direction of the cylindrical portion of the sub valve body.

According to the present structure, it is possible to stably inhibit the discharge of the fluid from the back pressure chamber to the sub valve body flow passage, by pressing the lower end portion of the cylindrical portion of the sub valve body against the concave portion of the main valve body.

In the above structure, it is desirable that the concave portion of the inner wall tip portion be formed into a conical shape, and when the sub valve body is located in the sub valve body sealing position, a slant face of the concave portion be in close contact with the periphery of the end face of the cylindrical portion entirely in the circumferential direction.

According to the present structure, it is possible to more stably inhibit the discharge of the fluid from the back pressure chamber to the sub valve body flow passage, by pressing the lower end portion of the cylindrical portion of the sub valve body against the concave portion of the main valve body.

In the above structure, it is desirable that the sub valve body communication port be opened on the flank extending along the axial direction of the cylindrical portion of the sub valve body; the concave portion be formed into a cylindrical shape so as to allow the cylindrical portion to enter therein; and the sub valve body communication port be located in such a position in the cylindrical portion that the sub valve body communication port is sealed when the cylindrical portion enters in the concave portion according to the movement of the sub valve body, and the sub valve body communication port communicates with the back pressure chamber when the cylindrical portion is detached from the concave portion according to a movement of the sub valve body.

According to the present structure, it is possible to inhibit the discharge of the fluid from the back pressure chamber to the sub valve body flow passage, by entering the cylindrical portion of the sub valve body into the concave portion of the main valve body. It is also possible to adjust an opening area of the sub valve body communication port, according to a relative movement of the sub valve body with respect to the main valve body, to control an opening/closing operation of the main valve body at a high accuracy.

In the above structure, it is desirable that the first flow rate adjusting mechanism and the second flow rate adjusting mechanism be an orifice located in the first communication passage and an orifice located in the second communication passage, respectively.

According to the present structure, a high pressure of the first fluid chamber or the second fluid chamber is restrained from being applied to the back pressure chamber or the sub valve body, by an easy orifice structure formed in each of the communication passages. As a result, it is possible to reduce electric power consumption of the electric motor.

In the above structure, it is desirable that the first flow rate adjusting mechanism and the second flow rate adjusting mechanism be located between the first fluid chamber and the switching mechanism, and between the second fluid chamber and the switching mechanism, respectively.

According to the present structure, it is possible to individually set a flow rate necessary to each of the communication passages.

The present invention provides an electrically-driven flow rate control valve capable of controlling a flow rate of a fluid which flows between two inlet/outlet ports, with restraining a high pressure of the fluid from being applied to a sub valve body connected to an electric motor.

BRIEF DESCRIPTION OF THE DRAWINGS

FIG. 1 is a sectional view of an electrically-driven flow rate control valve according to one embodiment of the present invention.

DESCRIPTION OF THE PREFERRED EMBODIMENTS

Figure 2:
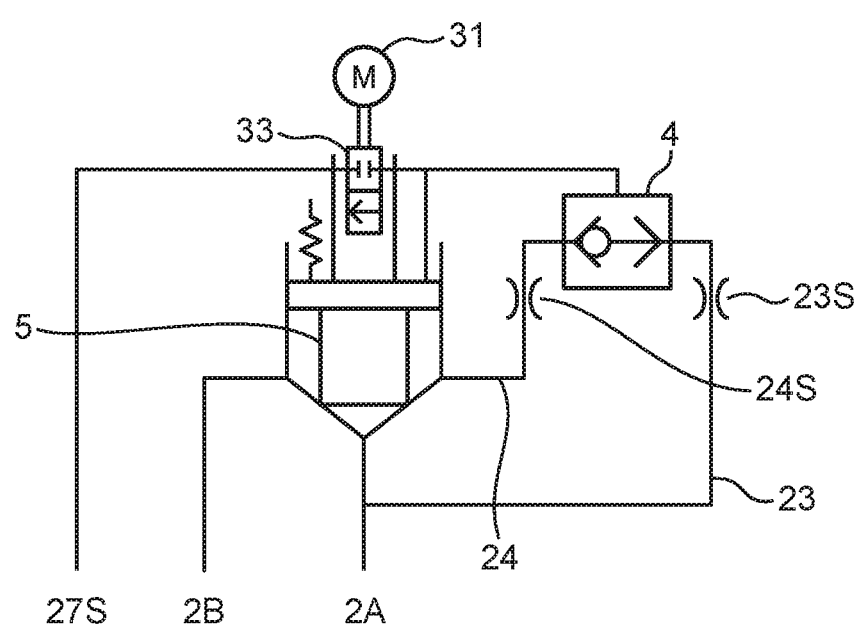
FIG. 2 is a hydraulic circuit diagram of the electrically-driven flow rate control valve of FIG. 1.

Hereinbelow one embodiment of the present invention will be described with reference to the drawings. FIG. 1 is a sectional view of a flow rate control valve 1 (electrically-driven flow rate control valve) according to the present embodiment. FIG. 2 is a hydraulic circuit diagram of the flow rate control valve 1 of FIG. 1. Hereinafter, directions "up" "down", "left", and "right" will be shown in each of the drawings. However, those directions are not to limit a mode of use, or the like, of the electrically-driven flow rate control valve according to the present invention, but are shown for convenience in illustrating a structure of the flow rate control valve 1 according to the present embodiment. The flow rate control valve 1 according to the present embodiment controls a flow of an operating oil in two directions, and used in a hydraulic circuit of a construction machine, as an example.

With reference to FIG. 1, the flow rate control valve 1 is provided with a casing 2, a raising/lowering drive device 3, a supply-switching valve 4 (switching mechanism), a main valve body 5, and a valve-closing spring 6 (urging mechanism). The raising/lowering drive device 3 has an electric motor 31, a rotational raising/lowering device 32, and a sub valve body 33. In the flow rate control valve 1, the main valve body 5 is moved by driving the raising/lowering drive device 3, and a flow rate control of an operating is performed by making a first port 2A and a second port 2B which are formed in the casing 2 communicate with each other.

The casing 2 houses or keeps each member of the flow rate control valve 1. In the present embodiment, the casing 2 has a substantially rectangular shape. The casing 2 has a first oil chamber 21 (first fluid chamber), a second oil chamber 22 (second fluid chamber), an oil chamber communication port 2C (fluid chamber communication port) and a cylinder unit 2S. The first oil chamber 21 and the second oil chamber 22 allow the operating oil (fluid) to be housed in the inside thereof. The first oil chamber 21 is formed in a bottom portion of the casing 2. In the present embodiment, the first oil chamber 21 is formed into a cylindrical shape (columnar shape) having a center axis CL extending in the up-down direction as its center. The second oil chamber 22 is located above the first oil chamber 21. The second oil chamber 22 has a rectangular shape extending in a horizontal direction. Incidentally, although the second oil chamber 22 is divided into a part in the left side and a part in the right side of the main valve body 5 in FIG. 1, these parts communicate with each other through the part adjacent to the main valve body 5 in a front-back direction (direction orthogonal to the paper face of FIG. 1).

The oil chamber communication port 2C is formed in an upper end portion of the first oil chamber 21, in other words, in a lower end portion (bottom portion) of the second oil chamber 22, and makes the first oil chamber 21 and the second oil chamber 22 communicate with each other. The oil chamber communication port 2C has a circle shape when viewed along the center axis CL. In a lower face portion and in a right side portion of the casing 2, a first port 2A (first inlet/outlet port) and a second port 2B (second inlet/outlet port) are formed, respectively. The first port 2A allows the operating oil to flow in/out therethrough between the outside of the casing 2 and the first oil chamber 21. Similarly, the second port 2B allows the operating oil to flow in/out therethrough between the outside of the casing 2 and the second oil chamber 22.

The electric motor 31 is controlled by a control unit 7, and in the present embodiment, configured to be rotatable around the center axis CL in a first rotational direction and in a second rotational direction which is opposite to the first rotational direction.

The rotational raising/lowering device 32 is threadedly engaged with an output axis of the electric motor 31, and also linked to the sub valve body 33, and converts a rotational force generated by the electric motor 31 into a moving force in the axial direction. As a result, when the electric motor 31 rotates, the sub valve body 33 is moved along the up-down direction (raised/lowered). As an example, the rotational raising/lowering device 32 has a publicly known ball screw mechanism, and also has a high accuracy speed reduction gear inside.

The main valve body 5 has a cylindrical shape having an upper end portion opened. The main valve body 5 has a main valve body tip portion 5A, a cylindrical space 5S (inner space), and an inner wall tip portion 5S1. The main valve body tip portion 5A is configured to have a conical shape tapered downward, and to be capable of sealing the oil chamber communication port 2C from above, along the axial direction. The cylindrical space 5S communicates with a back pressure chamber 20 in the opposite side in the axial direction from the main valve body tip portion 5A, and is formed into a tubular shape along the axial direction. As shown in FIG. 1, the cylindrical space 5S is configured to be capable of being entered by the sub valve body 33. The inner wall tip portion 5S1 is a part of an inner wall portion of the main valve body 5, and defines an end face in the side of the main valve body tip portion 5A of the cylindrical space 5S (bottom face of the cylindrical space 5S). In the present embodiment, the inner wall tip portion 5S1 has a tip concave portion 5B. The concave portion 5B allows a cylindrical portion 33R of the sub valve body 33 to enter therein and comes to close contact with the cylindrical portion 33R entirely in the circumferential direction, as will be described later. In particular, in the present embodiment, the concave portion 5B is formed into a conical shape having the center axis CL as its center, and a slant face of the concave portion 5B comes to close contact with an end face (periphery) of the cylindrical portion 33R of the sub valve body 33, entirely in the circumferential direction, as shown in FIG. 1.

The main valve body 5 is housed in the cylinder unit 2S in a manner movable along the center axis CL (predetermined axial direction), between a main valve body unblocking position (FIG. 3) and a main valve body sealing position (FIG. 1). A shown in FIG. 1, the main valve body 5 forms the back pressure chamber 20 between the cylinder unit 2S and itself which allows the operating oil to flow therein/therefrom. When the main valve body 5 is located in the main valve body unblocking position, the main valve body tip portion 5A unblocks the oil chamber communication port 2C to allow a circulation of the operating oil between the first oil chamber 21 and the second oil chamber 22. When the main valve body 5 is located in the main valve body sealing position, the main valve body tip portion 5A seals the oil chamber communication port 2C from above, to block the circulation of the operating oil between the first oil chamber 21 and the second oil chamber 22.

In addition, in the casing 2, a first oil passage 23 (first communication passage), a second oil passage 24 (second communication passage), and a discharge oil passage 27 are formed. The first oil passage 23 is an oil passage capable of making the first oil chamber 21 and the back pressure chamber 20 communicate with each other. Similarly, the second oil passage 24 is an oil passage capable of making the second oil chamber 22 and the back pressure chamber 20 communicate with each other. Incidentally, in the present embodiment, the side of the back pressure chamber 20 of the first oil passage 23 and the side of the back pressure chamber 20 of the second oil passage 24 join up with each other into a joined oil passage 26. The discharge oil passage 27 introduces the operating oil discharged from the back pressure chamber 20 through the sub valve body 33 to the outside of the casing 2, as will be described later. A discharge port 27S is located in the terminal portion of the discharge oil passage 27 in the casing 2.

The valve-closing spring 6 urges the main valve body 5 towards the main valve body sealing position, along the center axis CL. In the present embodiment, the valve-closing spring 6 is located in a state fitting onto the sub valve body 33, in the cylindrical space 5S of the main valve body 5 and the back pressure chamber 20, as shown in FIG. 1. The upper end portion of the valve-closing spring 6 is fixed to an inner wall portion of the casing 2 (upper face portion of the hack pressure chamber 20), and the lower end portion of the valve-closing spring 6 is fixed to the inner wall tip portion 5S1 of the main valve 5 body.

The supply-switching valve 4 is a direction-switching valve, and located in the vicinity of an entrance of the joined oil passage 26, in the first oil passage 23 and the second oil passage 24. The supply-switching valve 4 is configured to be capable of changing state between a first communication state and a second communication state. Specifically, when a pressure of the operating oil in the first oil chamber 21 is higher than a pressure of the operating oil in the second oil chamber 22, the supply switching valve 4 allows the circulation of the operating oil in the first oil passage 23, and blocks the circulation of the operating oil in the second oil passage 24 (first communication state). When the pressure of the operating oil in the first oil chamber 21 is lower than the pressure of the operating oil in the second oil chamber 22, the supply-switching valve 4 allows the circulation of the fluid in the second oil passage 24, and blocks the circulation of the fluid in the first oil passage 23 (second communication state). By the supply-switching valve 4, it is possible to automatically supply the operating oil from a high pressure side of the first oil chamber 21 and the second oil chamber 22, to the back pressure chamber 20.

A shown in FIG. 1, the first oil passage 23 has a first orifice 23S (first flow rate adjusting mechanism), and the second oil passage 24 has a second orifice 24S (second flow rate adjusting mechanism). The first orifice 23S is located between the first oil chamber 21 and the supply-switching valve 4. The first orifice 23S is to generate a pressure loss in the first oil passage 23, and adjusts the flow rate of the operating oil which flows from the first oil chamber 21 towards the back pressure chamber 20, so as to lower the flow rate of the operating oil. Similarly, the second orifice 24S is to generate a pressure loss in the second oil passage 24, and is located between the second oil chamber 22 and the supply-switching valve 4. The second orifice 24S adjusts the flow rate of the operating oil which flows from the second oil chamber 22 towards the back pressure chamber 20, so as to lower the flow rate of the operating oil. By the first orifice 23S and the second orifice 24S, it is possible to supply a fluid pressure necessary to drive the main valve body 5 to the back pressure chamber 20, and an excessive pressure is restrained from being supplied to the back pressure chamber 20.

The sub valve body 33 is housed within the back pressure chamber 20 and the cylindrical space 5S of the main valve body 5. In the present embodiment, the sub valve body 33 is formed with a pipe member linearly extending along the center axis CL. In other words, the sub valve body 33 has a cylindrical portion 33R located at least in a tip portion thereof (lower end portion, or end portion in the side of the inner wall tip portion 5S1). An upper end portion of the sub valve body 33 is connected to the rotational raising/lowering device 32. The sub valve body 33 has a sub valve body oil passage 33S (sub valve body flow passage) and a sub valve body communication port 33T. The sub valve body oil passage 33S is an oil passage extending inside the sub valve body 33 in the up-down direction. The upper end portion of the sub valve body oil passage 33S communicates with the discharge oil passage 27. The sub valve body communication port 33T opens in a lower end face (end face) of the cylindrical portion 33R of the sub valve body 33. The sub valve body communication port 33T makes the back pressure chamber 20 and the sub valve body oil passage 33S communicate with each other.

The sub valve body 33 is movable relatively to the main valve body 5, along the axial direction, between a sub valve body unblocking position and a sub valve body sealing position by receiving a driving force generated by the electric motor 31. When the sub valve body 33 is located in the sub valve body unblocking position, the lower end portion of the sub valve body 33 (cylindrical portion 33R) is separated upward from the inner wall tip portion 5S1 of the main valve body 5. As a result, the sub valve body 33 unblocks the sub valve body communication port T, to allow the operating oil in the back pressure chamber 20 to be discharged to the outside of the casing 2 through the sub valve body oil passage 33S and the discharge oil passage 27. When the sub valve body 33 is located in the sub valve body sealing position, the lower end portion of the sub valve body 33 abuts a slant face portion of the concave portion 5B of the main valve body 5 entirely in the circumferential direction. As a result, the sub valve body 33 seals the sub valve body communication port 33T, to block the circulation of the operating oil between the back pressure chamber 20 and the sub valve body oil passage 33S. Incidentally, as will be described later, the sub valve body 33 located in the sub valve body sealing position allows the main valve body 5 to be located in the main valve body sealing position by receiving an urging force of the valve-closing spring 6.

Figure 3:
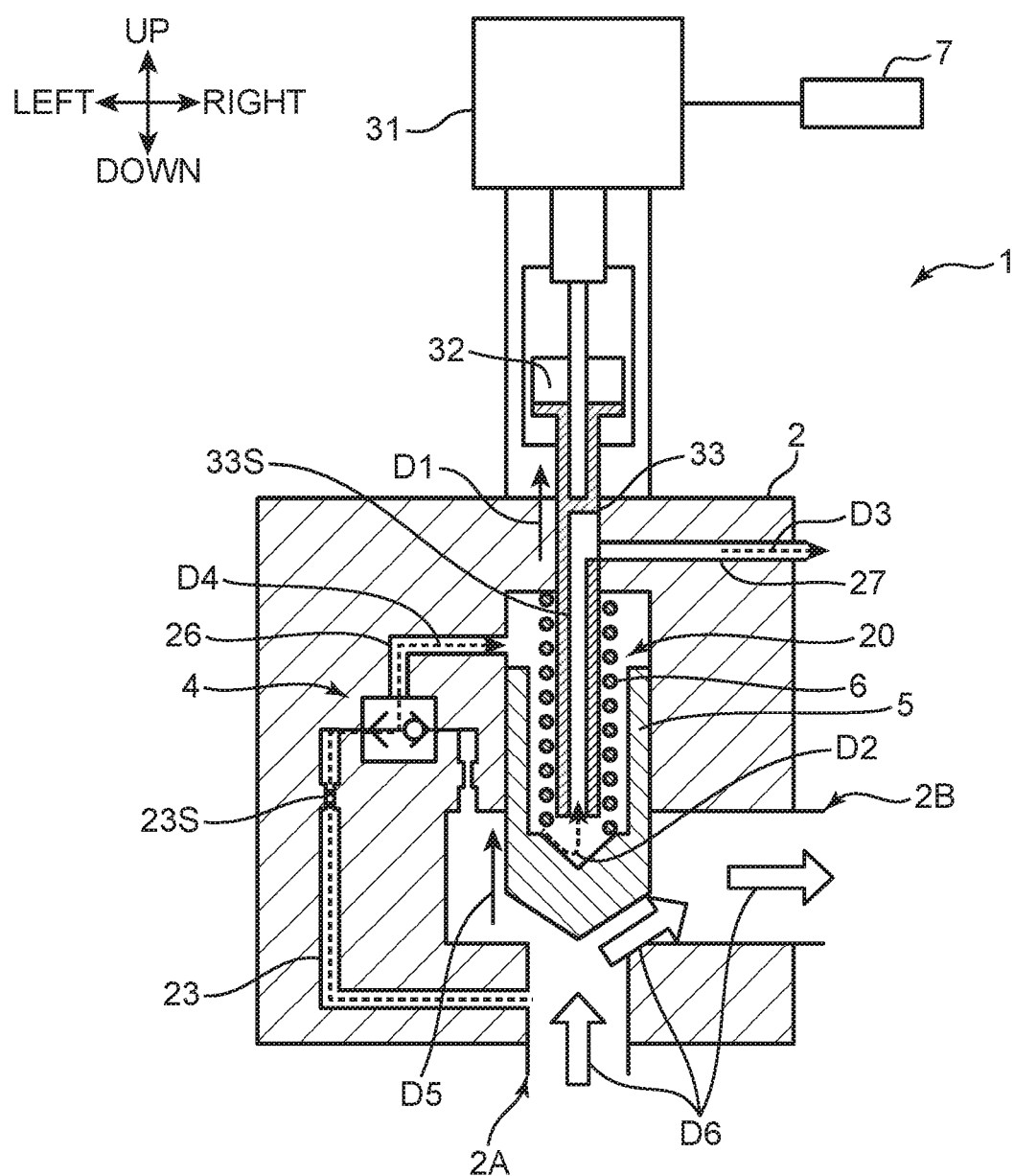
FIG. 3 is a sectional view showing an opening state of a main valve body of the electrically-driven flow rate control valve of FIG. 1.
Figure 4:
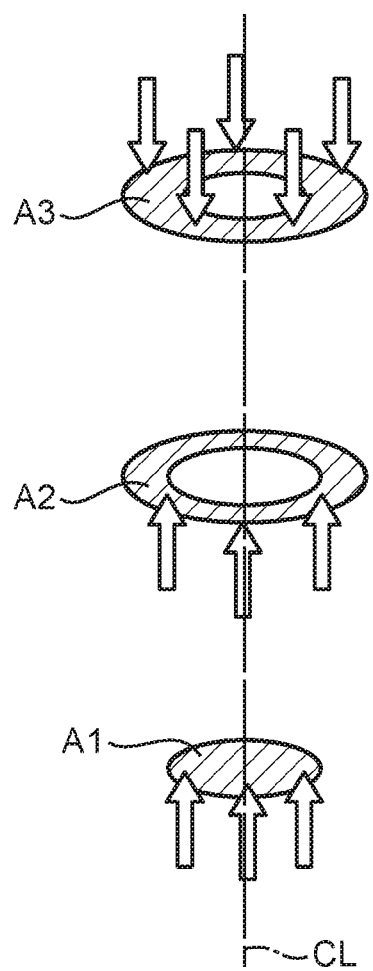
FIG. 4 is a schematic view to illustrate forces applied to the main valve body of the electrically-driven flow rate control valve of FIG. 1.
Figure 5:
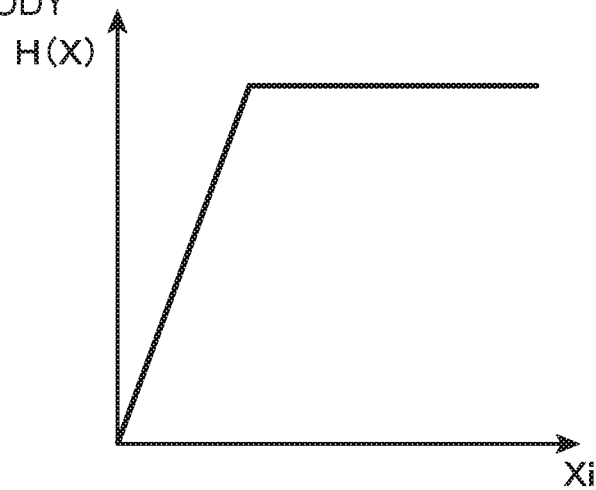
FIG. 5 is a graph showing a relationship of an area of opening of a sub valve body with a relative distance Xi of the main valve body and the sub valve body, in the electrically-driven flow rate control valve of FIG. 1.

FIG. 3 is a sectional view showing an opening state of the main valve body 5 of the flow rate control valve 1 of FIG. 1. FIG. 4 is a schematic view to illustrate forces applied to the main valve body 5 of the flow rate control valve 1 of FIG. 1. FIG. 5 is a graph showing a relationship of area of opening between the sub valve body 33 and the main valve body 5 with a relative distance Xi of the main valve body 5 and the sub valve body 33, in the flow rate control valve 1 of FIG. 1.

In the present embodiment, the electric motor 31 controlled by the control unit 7 is rotationally driven as a driving force. The rotational raising/lowering device 32 is capable of converting between a rotational motion and a translational motion, and converts a rotational motion of the electric motor 31 into a translational motion (up-down direction of FIG. 1) and moves translationally together with the sub valve body 33 which is linked with the rotational raising/lowering device 32. Then, by the translational motion of the main valve body 5 linked with a movement of the sub valve body 33, the area of opening between the first oil chamber 21 and the second oil chamber 22 is changed at the oil chamber communication port 2C, to adjust the flow rate of the operating oil. The following describes a principle of an operation of the flow rate control valve 1, with reference to a case in which the operating oil flows from the first port 2A to the second port 2B, as an example.

Forces received by the main valve body 5 is described with reference to FIG. 4. In a state where the main valve body tip portion 5A of the main valve body 5 seals the oil chamber communication port 2C, a pressure receiving area of the main valve body tip portion 5A in the side of the first oil chamber 21 (area imaged in a direction parallel to the center axis CL) is defined as A1, and a pressure receiving area of the main valve body tip portion 5A in the side of the second oil chamber 22 is defined as A2. In this connection, a shape of the main valve body 5 is configured to satisfy A1<A3. A pressure receiving area of the main valve body 5 in the upper end portion, namely, in the side of the back pressure chamber 20 is defined as A3. In addition, a pressure of the first oil chamber 21 is defined as P1, a pressure of the second oil chamber 22 is defined as P2, and a pressure of the back pressure chamber 20 is defined as P3. A stroke (magnitude of displacement) of the main valve body 5 is defined as X, a stroke of the sub valve body 33 is defined as Xr, and a relative stroke (magnitude of relative displacement) of the sub valve body 33 to the main valve body 5 is defined as Xi (=X−Xr), in an axial direction parallel to the center axis CL. An area of opening of the main valve body 5 which unblocks the oil chamber communication port 2C is defined as G(X), and an area of opening between the sub valve body 33 and the main valve body 5, which is formed in the lower end portion of the sub valve body 33, is defined as H(Xi). The opening areas G(X) and H(Xi) are functions of strokes X and Xi, respectively. Opening areas of the first orifice 23S and the second orifice 24S set in advance are defined as Am. In addition, a passing flow rate of the operating oil from the first oil chamber 21 to the second oil chamber 22 through the oil chamber communication port 2C is defined as Q1, and a passing flow rate of the operating oil from the back pressure chamber 20 to the discharge port 27S through the sub valve body communication port 33T is defined as Q2. A spring coefficient of the valve-closing spring 6 is defined as ks, and a spring set force of the valve-closing spring 6 (a force to urge the main valve body 5 at an initial state) is defined as Fs0.

Considering a balance of forces which act on the main valve body 5 in the axial direction, forces Fa and Fb applied by the operating oil to the main valve body 5 in the valve-opening direction (upward direction of FIG. 1) can be represented by the following Formula 1 and Formula 2.

$$Fa = P1 \times A1 \quad \text{(Formula 1)}$$

$$Fb = P2 \times A2 \quad \text{(Formula 2)}$$

Similarly, a force Fc applied by the operating oil to the main valve body 5 in the valve-closing direction (downward direction of FIG. 1) can be represented by the following Formula 3.

$$Fc = P3 \times A3 \quad \text{(Formula 3)}$$

A spring force Fs applied by the valve-closing spring 6 to the main valve body 5 can be represented by the following Formula 4.

$$Fs = Fs0 + ks \times X \quad \text{(Formula 4)}$$

A force F which acts on the main valve body 5 can be represented by the following Formula 5.

$$F = Fa + Fb − (Fc + Fs) \quad \text{(Formula 5)}$$

According to Formula 5, the main valve body 5 comes to rest when F=0. The main valve body 5 moves in the valve-opening direction when F>0, and the main valve body 5 moves in the valve-closing direction when F<0.

Described below is a valve-opening operation of the main valve body 5, when the pressure of the first oil chamber 21 is higher than the pressure of the second oil chamber 22.

<In initial State (X=0)>

In a valve-closing state that the main valve body 5 seals the oil chamber communication port 2C, strokes of the main valve body 5 and the sub valve body 33 are both zero. Namely, the following relational expression 6 holds.

$$X=0, Xr=0, Xi=X-Xr=0 \quad \text{(Formula 6)}$$

In this case, since an opening area H(X) of the sub valve body 33 is zero, the flow rate Q2 of the operating oil discharged from the discharge port 27S is also zero, as shown in FIG. 5. Here, the flow rate Q2 of the operating oil discharged from the discharge port 27S is equal to the flow rate of the operating oil which flows in the back pressure chamber 20 from the first oil chamber 21. Since the flow rate of the operating oil passing through the first orifice 23S is also zero, the pressure of the first oil chamber 21 and the pressure of the back pressure chamber 20 are equal (P1=P3). Therefore, Formula 5 may be replaced with the following Formula 7.

$$F=P1 \times A1+P2 \times A2-(P3 \times A3+Fs)<0 \quad \text{(Formula 7)}$$

That is, the main valve body 5 is always pressed to the oil chamber communication port 2C, irrespective of the pressure of the first oil chamber 21 and the second oil chamber 22, and is capable of blocking the flow of the operating oil from the first oil chamber 21 to the second oil chamber 22. At this time, since it is only necessary to press the sub valve body 33 onto the main valve body 5 so that predetermined relative positions thereof are kept, it is possible to block the flow between the first oil chamber 21 and the second oil chamber 22, without consuming electric power by the electric motor 31.

<Valve-Opening Operation>

When the electric motor 31 is rotated by the control unit 7 to move the sub valve body 33 upward, from the initial state described above, relative positions of the main valve body 5 and the sub valve body 33 are changed. As a result, a gap is made between a lower end portion of the sub valve body 33 and the concave portion 5B of the main valve body 5, and the operating oil of the back pressure chamber 20 is discharged from the sub valve body communication port 33T, through the sub valve body oil passage 33S and the discharge oil passage 27. That is, a flow rate Q2 which passes through the discharge oil passage 27 is generated. As a result, the operating oil of the flow rate Q2 flows in the back pressure chamber 20 from the first oil chamber 21. At this time, since the operating oil of the flow rate Q2 passes through the first orifice 23S, the following Formula 8 is introduced.

$$Q2=C \times Am \times \sqrt{AP1-P3})=C \times H(Xi)\sqrt{(P3)} \quad \text{(Formula 8)}$$

Incidentally, C represents a flow rate coefficient determined from a shape the first orifice 23S or a fluid specification. The following Formula 9 is introduced from Formula 8.

$$P3=Am^2/(H(X)^2+Am^2) \times P1 \quad \text{(Formula 9)}$$

On the other hand, Formula 5 may be represented as the following Formula 10, on the basis of Formulas 1 to 4.

$$F=P1 \times A1+P2 \times A2-(P3 \times A3+(Fs0+ks \times X)) \quad \text{(Formula 10)}$$

According to Formula 9 and Formula 10, the pressure P3 of the back pressure chamber 20 is decreased as the stroke Xi of the sub valve body 33 becomes larger. As a result, the force F applied to the main valve body 5 is increased, and the main valve body 5 is pushed up in the valve-opening direction by a differential pressure. Then, the first oil chamber 21 and the second oil chamber 22 communicate with each other through the oil chamber communication port 2C, to allow the circulation of the operating oil. At this time, according to Formula 9, a position of the main valve body 5 is kept in such a state that the pressure P3 of the back pressure chamber 20 satisfies F=0, in other words, the opening area H(Xi) of the sub valve body 33 satisfies F=0.

The flow of the operating oil is described on the basis of FIG. 1 and FIG. 3. When the electric motor 31 is driven from the state of FIG. 1 by the control unit 7, the sub valve body 33 is moved upward as shown by the arrow D1 in FIG. 3. As a result, the sub valve body communication port 33T is pulled out from the concave portion 5B (FIG. 1), to make the back pressure chamber 20 and the sub valve body oil passage 33S communicate with each other through the sub valve body communication port 33T, and the operating oil is discharged from the back pressure chamber 20 (arrows D2 and D3). An area of opening of the sub valve body communication port 33T is increased according to the amount of the movement of the sub valve body 33, to a fixed area sometime later (see FIG. 5). As a result, the operating oil flows in the back pressure chamber 20 (arrow D4) from the first oil chamber 21 (FIG. 1) through the first oil passage 23. This changes a balance between a differential pressure between the back pressure chamber 20 and the first oil chamber 21 and an urging force of the valve-closing spring 6, to thereby move the main valve body 5 upward (arrow D5). As a result, the operating oil flows in the second oil chamber 22 from the first oil chamber 21 (arrow D6).

As described above, in the present embodiment, when the main valve body 5 is opened, a high pressure of the operating oil of the first oil chamber 21 never acts directly on the sub valve body 33. Therefore, the electric motor 31 only needs to generate a driving force to move the sub valve body 33 including an inertia or a frictional resistance of the sub valve body 33. Therefore, the electric motor 31 never requires a large electric power in keeping the sub valve body 33 against the pressure of the first oil chamber 21. Incidentally, in the above, an empty weight of the main valve body 5 is regarded as zero. Since the empty weight of the main valve body 5 is 0.2 kg, while the pressure of the operating oil which acts on the main valve body 5 is, for example, 650 N (66 kg), the empty weight of the main valve body 5 may be regarded as zero. When the empty weight of the main valve body 5 becomes larger, the pressure receiving areas A1 and A2 are increased, to achieve an effect similar to the above.

<Valve-Closing Operation>

In the above valve-opening state, when the electric motor 31 is rotated in the second rotational direction by the control unit 7 to move the sub valve body 33 downward, a stroke amount Xi of the sub valve body 33 becomes small, and the flow rate Q2 of the operating oil discharged from the back pressure chamber 20 to the discharge oil passage 27 is decreased. As a result, the pressure P3 of the back pressure chamber 20 rises, and when the pressure P3 satisfies F<0 in Formula 10 sometime later, the main valve body 5 is thrusted downward by a differential pressure and moves in the valve-closing direction. Incidentally, similarly as the valve opening operation described above, when a relative position Xi satisfies F=0 in Formula 10, the main valve body 5 stops. Then, the sub valve body 33 is lowered by the electric motor 31, and when moved to a lowermost position, the main valve body 5 is pushed onto the oil chamber communication port 20, and blocks the circulation of the operating oil between the first oil chamber 21 and the second oil chamber 22. Incidentally, when the main valve body 5 is located in the main valve body sealing position (FIG. 1), the pressure of the back pressure chamber 20 does not directly act on the lower end face of the sub valve body 33 (sub valve body communication port 33T). As a result, the sub valve body 33 is restrained from being pushed upward by the pressure of the back pressure chamber 20. Therefore, at a time of valve-closing, it is not necessary to keep the sub valve body 33 against the pressure of the back pressure chamber 20, which reduces electric power consumption of the electric motor 31.

In a case that the pressure of the second oil chamber 22 is higher than that of the first oil chamber 21, where the operating oil is to be circulated from the second oil chamber 22 to the first oil chamber 21 through the oil chamber communication port 2C, the operating oil is supplied to the back pressure chamber 20 from the second oil chamber 22 by the supply-switching valve 4. At this time, the operating oil passes through the second orifice 24S, to thereby restrain a high pressure from being applied to the sub valve body 33. Incidentally, the first orifice 23S and the second orifice 24S are not necessarily configured to have identical opening areas, but may configured to have any opening areas. That is, it is possible to set valve-opening condition of the main valve body 5 differently between a case where the operating oil circulates from the first port 2A to the second port 2B, and a case where the operating oil circulates from the second port 28 to the first port 2A. In addition, in this case, the pressure P2 of the second oil chamber 22 acts on the pressure receiving area A2, to thereby move the main valve body 5 in the valve-opening direction. Accordingly, it is similarly possible to control a valve-opening operation and a valve-closing operation, by replacing the pressure receiving area A1 with A2, and the pressure P1 with P2, in Formulas 1 to 10 described above.

As described above, in the present embodiment, it is possible control a position (opening/closing operation) of the main valve body 5 at a high accuracy by controlling the position of the sub valve body 33 by the electric motor 31. In particular, it is possible to reduce variation in control of the sub valve body 33 (main valve body 5) according to a speed reduction rate of the rotational raising/lowering device 32, in addition to an accurate rotation control which the electric motor 31 itself has. The first orifice 23S and the second orifice 24S are distributed in the first oil passage 23 and the second oil passage 24. Therefore, a high pressure of the first oil chamber 21 or the second oil chamber 22 is restrained from being directly applied to the sub valve body 33, and a pressure necessary to drive the main valve body 5 is supplied to the back pressure chamber 20. As a result, it is not necessary to drive the sub valve body 33 against the high pressure, and the electric motor 31 only needs to generate a driving force to move the sub valve body 33 relative to the main valve body 5. This realizes an electric power saving, an output saving, and a downsizing of the flow rate control valve 1. Incidentally, in order to realize a stable valve-opening and valve-closing operation of the main valve body 5 as described above, it is desirable that the pressure receiving area of the main valve body 5 satisfies the relationship of A1<A3.

In addition, in the present embodiment, the supply-switching valve 4 is capable of automatically selecting the high pressure side of the first oil chamber 21 (first port 2A) and the second oil chamber 22 (second port 2B), and supplying the operating oil to the back pressure chamber 20 for an opening/closing operation of the main valve body 5. This allows controlling the flow of the operating oil in both directions between the first port 2A and the second port 2B, without the need of providing a plurality of direction-switching valves for supply of the operating oil to the back pressure chamber 20.

In the present embodiment, the oil chamber communication port 2C of the casing 2 has a circle shape when viewed from a direction orthogonal to the axial direction of the center axis CL, and the main valve body tip portion 5A of the main valve body 5 has a conical shape capable of sealing the oil chamber communication port 2C. Therefore, it is possible to stably inhibit a flow-in/flow-out of the operating oil throughout in the circumferential direction around the center axis CL of the main valve body tip portion 5A, by driving the main valve body 5 such that the main valve body tip portion 5A enters in the oil chamber communication port 2C.

In addition, in the present embodiment, it is possible to inhibit a discharge of the operating oil from the back pressure chamber 20 to the discharge oil passage 27, by pressing (entering) the lower end portion of the cylindrical portion 33R of the sub valve body 33 against the concave portion 5B of the main valve body 5. Accordingly, since a pressure of the back pressure chamber 20 does not act inside the sub valve body 33, it is possible to suppress electric power of the electric motor 31. Since the sub valve body communication port 33T is distributed in the lower end face (end face intersecting the axial direction) of the cylindrical portion 331 of the sub valve body 33, it is possible to stably inhibit the discharge of the operating oil, by pushing the cylindrical portion 33R onto the concave portion 5B. In addition, it is possible to keep a sealing function and to prevent a flowing-in/flowing-out of the operating oil, throughout in the circumferential direction around the center axis CL, by making the lower end portion of the cylindrical portion 33R having a cylindrical shape (straight tubular shape) abut the concave portion 5B of the conical shape. As a result, it is possible to inhibit the discharge of the operating oil, more stably. Since the sub valve body communication port 33T opens in the cylindrical portion 33R of the sub valve body 33, the pressure of the back pressure chamber 20 is hard to be applied to the sub valve body communication port 33T. In particular, since the lower end face of the cylindrical portion 33R of the sub valve body 33 is located in a bottom portion of the cylindrical space 5S of the main valve body 5, the pressure of the back pressure chamber 20 is hard to be applied to the lower end face of the cylindrical portion 33R of the sub valve body 33. This restrains a large electric power from being consumed in keeping a position of the sub valve body 33 at a time of valve-closing.

In the present embodiment, the first orifice 23S and the second orifice 24S are located in the first oil passage 23 and the second oil passage 24. Therefore, by an easy orifice structure formed in each of the oil passages, a high pressure of the first oil chamber 21 or the second oil chamber 22 is restrained from being directly applied to the back pressure chamber 20 or the sub valve body 33. As a result, it is possible to reduce electric power consumption of the electric motor 31. Since each oil passage is provided with a proper orifice, it is possible to set a flow rate necessary to each oil passage, individually. Incidentally, in a case where necessary flow quantities are equal between the oil passages, in other words, in a case where opening diameters of the first orifice 23S and the second orifice 24S are to be equal, it is also possible to provide a common orifice (flow rate adjusting mechanism) between the supply-switching valve 4 and the back pressure chamber 20.

As above, the flow rate control valve 1 (electrically-driven flow rate control valve) according to one embodiment of the present invention has been described. Incidentally, the present invention is not limited to any of the modes. A modified embodiment as follows is possible as the electrically-driven flow rate control valve according to the present invention.

Figure 6:
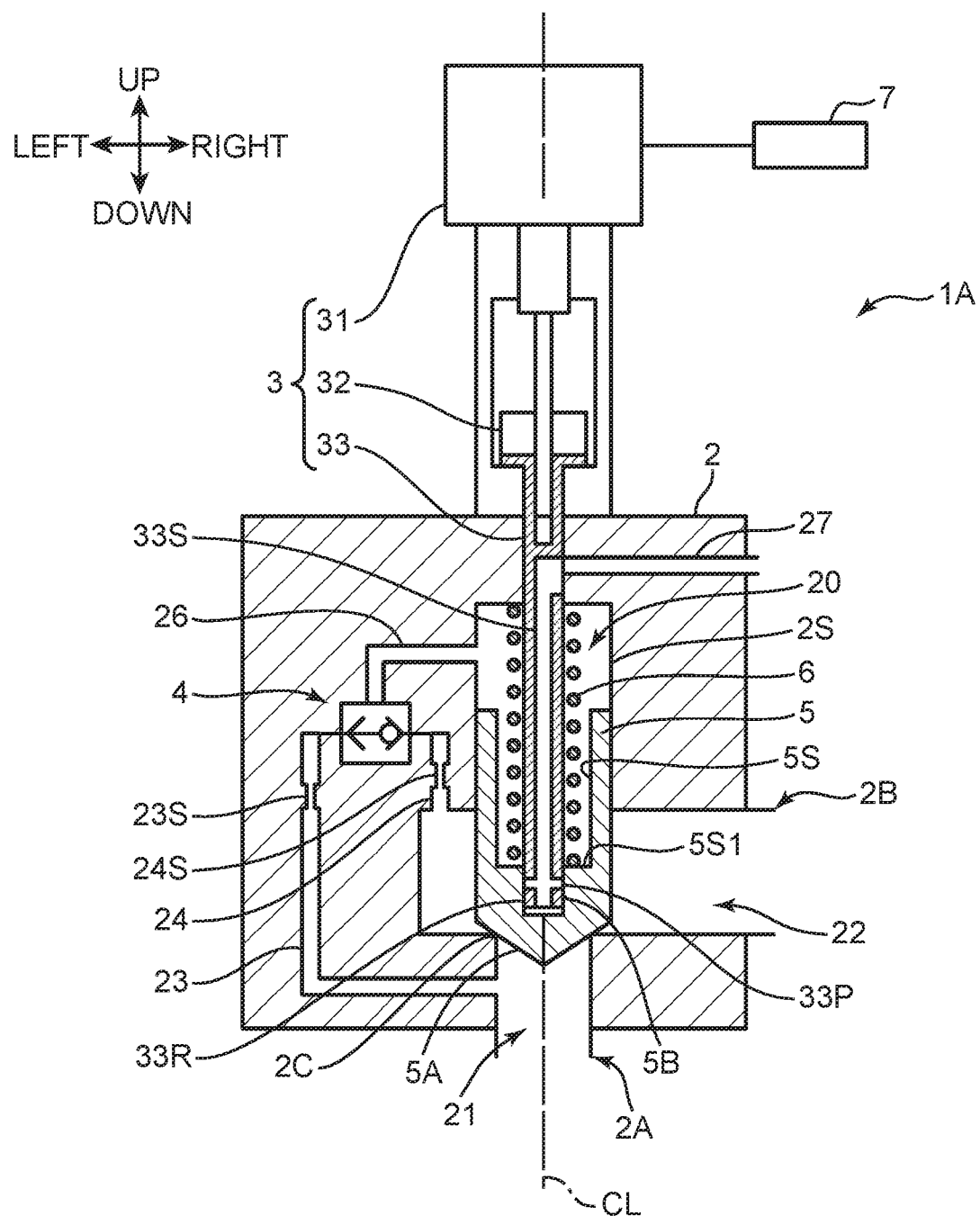
FIG. 6 is a sectional view of the electrically-driven flow rate control valve according to a modified embodiment of the present invention.
Figure 7:
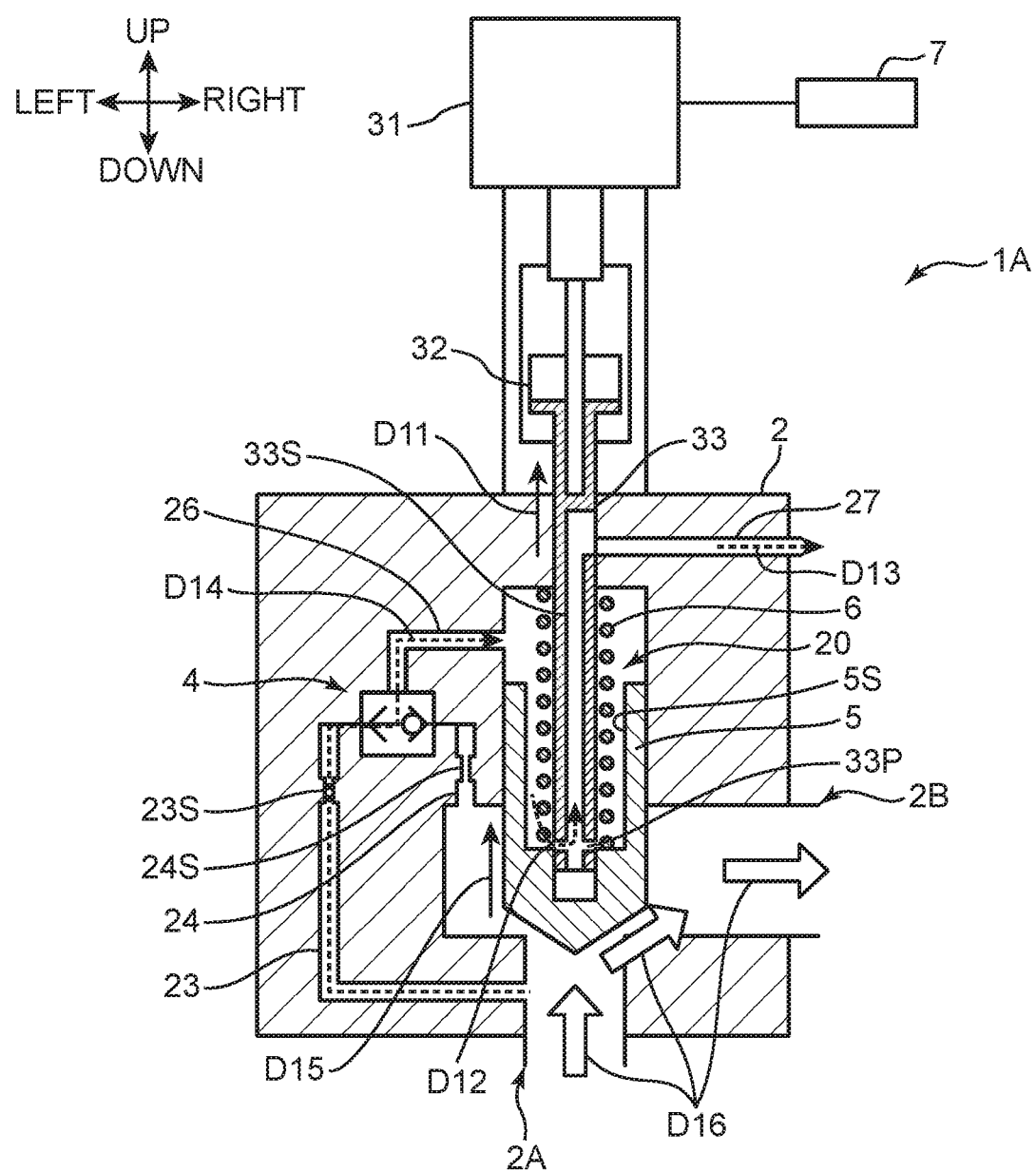
FIG. 7 is a sectional view showing an opening state of the main valve body of the electrically-driven flow rate control valve of FIG. 6.

(1) The embodiment has been described in a mode of having sub valve body communication port 33T opening in the lower end face of the cylindrical portion 33R of the sub valve body 33, and providing the inner wall tip portion 5S1 of the main valve body 5 with a concave portion 5B having a conical shape. However, the present invention is not limited to the mode. The concave portion 5B of FIG. 1 may also be formed into a cylindrical shape similarly as the lower end portion of the cylindrical portion 33R. It is possible, also in this case, to seal the sub valve body communication port 33T by entering the lower end portion of the cylindrical portion 33R in the concave portion 5B having a cylindrical shape. The sub valve body communication port 33T is not limited to the mode of opening in the lower end face of the cylindrical portion 33R. FIG. 6 is a sectional view of an electrically-driven flow rate control valve 1A according to a modified embodiment of the present invention. FIG. 7 is a sectional view showing an opening state of the main valve body 5 of the electrically-driven flow rate control valve 1A of FIG. 6.

Since the present modified embodiment differs in the location of the sub valve body communication port 33P, and differs in the shape of the concave portion 5B of the main valve body 5, in comparison with the embodiment, the differences are mainly described. An inner wall tip portion 5S1 of a main valve body 5 has a concave portion 5B which allows a cylindrical portion 33R of a sub valve body 33 to enter therein and to come close contact therewith entirely in the circumferential direction. The concave portion 5B has a cylindrical shape, and the inner diameter of the concave portion 5B is set to be slightly larger than the outer diameter of the cylindrical portion 33R. Meanwhile, a pair of left and right sub valve body communication ports 33P opens in round shapes in the flank (circumferential face) of the cylindrical portion 33R. The pair of sub valve body communication ports 33P communicates with a sub valve body oil passage 33S. Incidentally, the opening shapes of the sub valve body communication ports 33P may also be other shapes.

As the cylindrical portion 33R enters in the concave portion 5B according to a downward movement of the sub valve body 33, the sub valve body communication ports 33P are sealed with the inner circumferential face of the concave portion 5B. When the cylindrical portion 33R is detached from the concave portion 5B according to an upward movement of the sub valve body 33, the pair of sub valve body communication ports 33P communicates with a back pressure chamber 20. The sub valve body communication ports 33P are located in positions of the cylindrical portion. 38R by which such function is carried out.

Specifically, when an electric motor 31 is driven from the state of FIG. 6 by a control unit 7, the sub valve body 33 is moved upward as shown by the arrow D11 in FIG. 7. As a result, the sub valve body communication ports 33P are pulled out from the concave portion 5B (FIG. 6), to make the back pressure chamber 20 and the sub valve body oil passage 33S communicate with each other through the sub valve body communication ports 33P, to discharge an operating oil from the back pressure chamber 20 (arrows D12 and D13). Opening areas of the sub valve body communication ports 33P are increased according to an amount of movement of the sub valve body 33, to become invariable sometime later (see FIG. 5). As a result, the operating oil flows in the back pressure chamber 20 (arrow D14) from a first oil chamber 21 (FIG. 6) through a first oil passage 23. This changes a balance between a differential pressure between the back pressure chamber 20 and the first oil chamber 21 and an urging force of a valve-closing spring 6, to thereby move the main valve body 5 upward (arrow D15), similarly as in the embodiment. As a result, the operating oil flows in the second oil chamber 22 from the first oil chamber 21 (arrow D16).

As described above, also in the present modified embodiment, it is possible to inhibit the operating oil from being discharged from the back pressure chamber 20 to the sub valve body oil passage 33S, by entering the cylindrical portion 33R of the sub valve body 33 in the concave portion 5B of the main valve body 5. It is also possible to adjust opening areas of the sub valve body communication ports 33P, according to a relative movement of the sub valve body 33 with respect to the main valve body 5, to control an opening/closing operation of the main valve body 5 at a high accuracy. In the present modified embodiment, the sub valve body communication ports 33P are provided on the flank of the cylindrical portion 33R. This allows increasing a degree of freedom in an opening gain (amount of change of $H(X_i)$ relative to $X_i$) of the sub valve body communication ports 33P. For example, precision and stability of a valve-opening operation can thus be increased, because it is possible to decrease the amount of the movement of the main valve body 5 relative to the amount of the movement of the sub valve body 33 by lowering the opening gain of the sub valve body communication ports 33P. In addition, also in the present modified embodiment, a pressure of the back pressure chamber 20 is hard to be applied to the lower end face of the sub valve body 33, which reduces electric power consumption of the electric motor 31.

Figure 8:
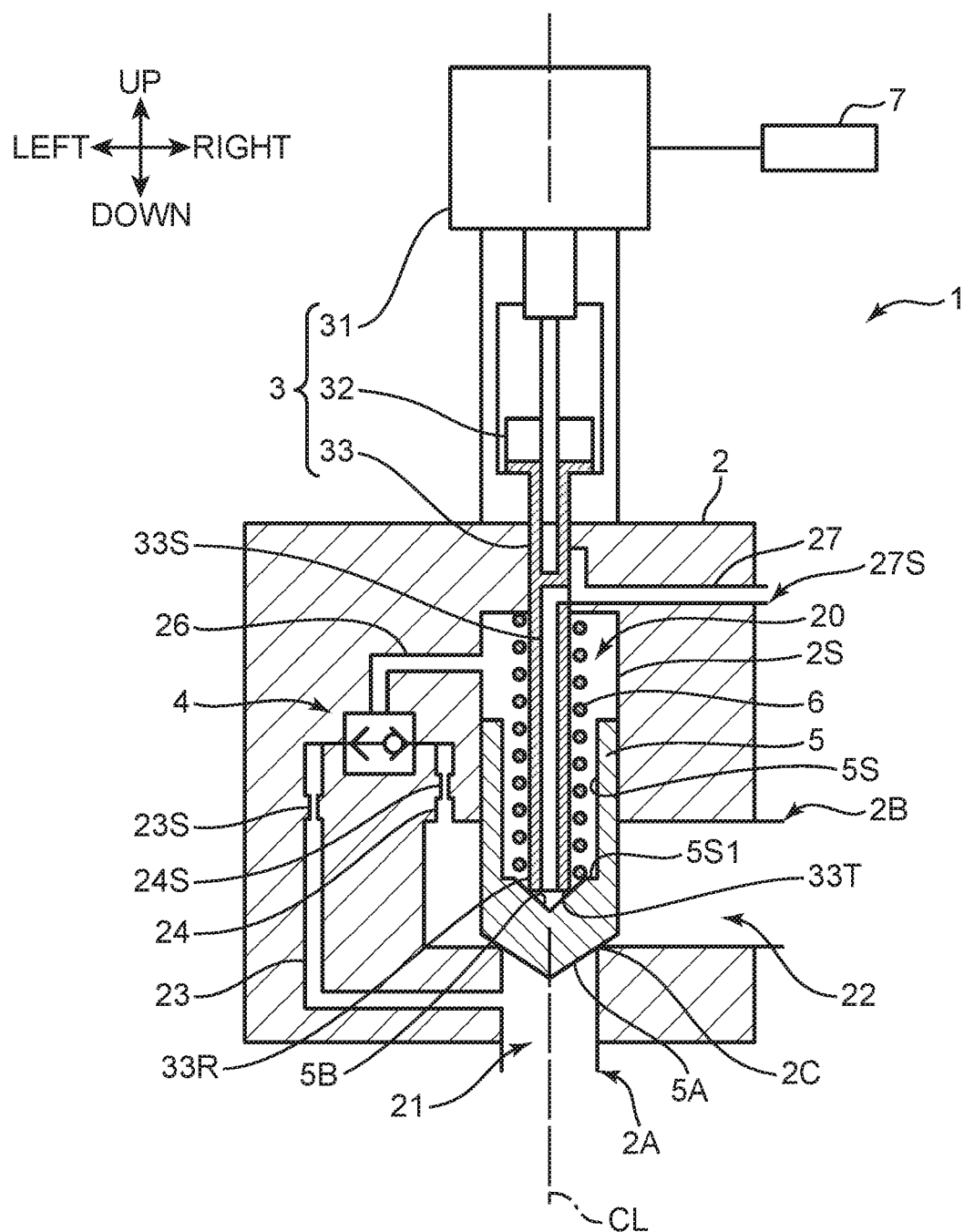
FIG. 8 is a sectional view of the electrically-driven flow rate control valve according to another modified embodiment of the present invention.
Figure 9:
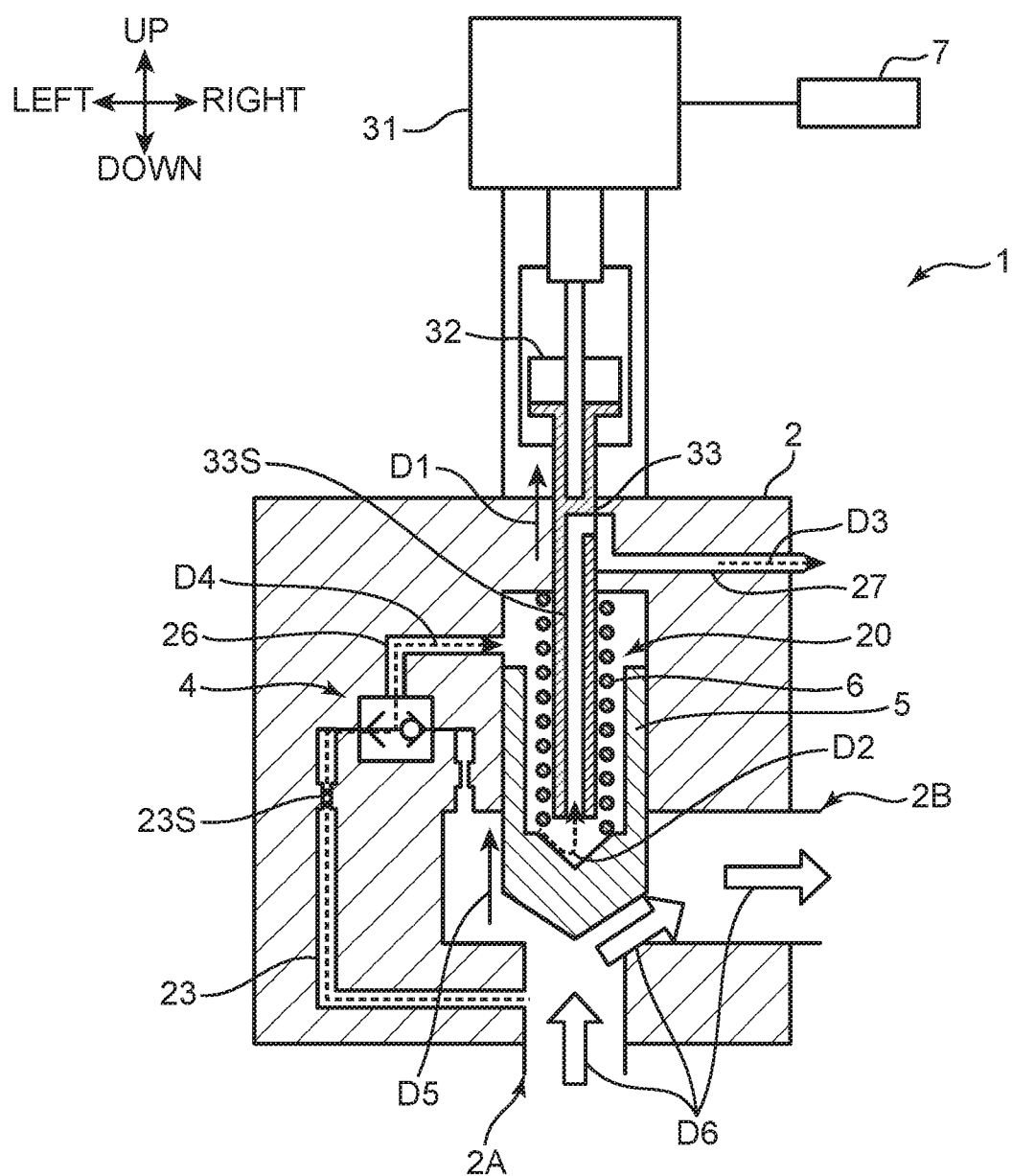
FIG. 9 is a sectional view of the electrically-driven flow rate control valve according to another modified embodiment of the present invention.

The present invention is not limited to the embodiments described above. For example, in the embodiments shown in FIGS. 8 and 9, the inlet port of the discharge oil passage 27 is formed in a shape extending upward so as to maintain the communication between the sub valve body oil passage 33S and the discharge oil passage 27, regardless of the upward or downward movement of the sub valve body 33.

What is claimed is:

1. An electrically-driven flow rate control valve, comprising:
a casing comprising a first fluid chamber, a second fluid chamber, a fluid chamber communication port which makes the first fluid chamber and the second fluid chamber communicate with each other, and a cylinder unit, wherein: a first inlet/outlet port which allows a fluid to flow in/out therethrough between an outside of the casing and the first fluid chamber, and a second inlet/outlet port which allows a fluid to flow in/out therethrough between the outside of the casing and the second fluid chamber, are formed in the casing;
an electric motor;
a main valve body comprising a main valve body tip portion capable of sealing the fluid chamber communication port, which is housed in the cylinder unit in a movable manner between a main valve body unblocking position and a main valve body sealing position, along a predetermined axial direction, and forms a back pressure chamber between the cylinder unit and itself which allows a fluid to flow therein/therefrom, wherein the main valve body tip portion allows a circulation of a fluid between the first fluid chamber and the second fluid chamber, by unblocking the fluid chamber communication port, when the main valve body is located in the main valve body unblocking position, and the main valve body tip portion blocks a circulation of a fluid between the first fluid chamber and the second fluid chamber, by sealing the fluid chamber communication port, when the main valve body is located in the main valve body sealing position;

an urging mechanism which urges the main valve body towards the main valve body sealing position;

a first communication passage capable of making the first fluid chamber and the back pressure chamber communicate with each other;

a second communication passage capable of making the second fluid chamber and the back pressure chamber communicate with each other;

a switching mechanism capable of changing state between a first communication state which allows a circulation of a fluid in the first communication passage, and blocks a circulation of a fluid in the second communication passage, when a pressure of a fluid in the first fluid chamber is higher than a pressure of a fluid in the second fluid chamber, and a second communication state which allows a circulation of a fluid in the second communication passage, and blocks a circulation of a fluid in the first communication passage, when a pressure of a fluid in the first fluid chamber is lower than a pressure of a fluid in the second fluid chamber;

a first flow rate adjusting mechanism which is located in the first communication passage and adjusts a flow rate of a fluid so as to lower the flow rate of the fluid flowing from the first fluid chamber towards the back pressure chamber;

a second flow rate adjusting mechanism which is located in the second communication passage and adjusts a flow rate of a fluid so as to lower the flow rate of the fluid flowing from the second fluid chamber towards the back pressure chamber;

a sub valve body housed in the back pressure chamber, comprising:
a sub valve body flow passage which communicates with the outside of the casing, and
a sub valve body communication port which makes the back pressure chamber and the sub valve body flow passage to communicate with each other,
which is movable relatively to the main valve body, along the axial direction, between a sub valve body unblocking position and a sub valve body sealing position by receiving a driving force generated by the electric motor, and
which unblocks the sub valve body communication port when the sub valve body is located in the sub valve body unblocking position, to allow a fluid of the back pressure chamber to be discharged to the outside of the casing through the sub valve body flow passage; and seals the sub valve body communication port when the sub valve body is located in the sub valve body sealing position, to block a circulation of a fluid between the back pressure chamber and the sub valve body flow passage, and to allow the main valve body to receive an urging force of the urging mechanism, to locate the main valve body in the main valve body sealing position.

2. The electrically-driven flow rate control valve according to claim 1, wherein:
the fluid chamber communication port has a circle shape when viewed along the axial direction, and
the main valve body tip portion has a conical shape capable of sealing the fluid chamber communication port, along the axial direction.

3. The electrically-driven flow rate control valve according to claim 1, wherein:
the main valve body comprises an inner space formed into a tubular shape along the axial direction, and communicates with the back pressure chamber at the opposite side from the main valve body tip portion, the inner space allows the sub valve body to enter therein, and an inner wall tip portion which defines a side of the main valve body tip portion of the inner space;
the sub valve body has a cylindrical portion located at least in an end portion in the side of the inner wall tip portion, and the sub valve body communication port opens in the cylindrical portion; and
the inner wall tip portion has a concave portion which allows the cylindrical portion of the sub valve body to enter therein, and comes in close contact with the cylindrical portion entirely in a circumferential direction.

4. The electrically-driven flow rate control valve according to claim 3, wherein the sub valve body communication port opens in the sub valve body, on an end face thereof which intersects the axial direction of the cylindrical portion of the sub valve body.

5. The electrically-driven flow rate control valve according to claim 4, wherein the concave portion of the inner wall tip portion is formed into a conical shape, and when the sub valve body is located in the sub valve body sealing position, a slant face of the concave portion is in close contact with the periphery of the end face of the cylindrical portion entirely in a circumferential direction.

6. The electrically-driven flow rate control valve according to claim 3, wherein:
the sub valve body communication port opens on a flank extending along the axial direction of the cylindrical portion of the sub valve body,
the concave portion is formed into a cylindrical shape so as to allow the cylindrical portion to enter therein, and
the sub valve body communication port is located in such a position in the cylindrical portion that: the sub valve body communication port is sealed when the cylindrical portion enters in the concave portion according to a movement of the sub valve body, and the sub valve body communication port communicates with the back pressure chamber when the cylindrical portion is detached from the concave portion according to a movement of the sub valve body.

7. The electrically-driven flow rate control valve according to claim 1, wherein the first flow rate adjusting mechanism and the second flow rate adjusting mechanism are an orifice located in the first communication passage and an orifice located in the second communication passage, respectively.

8. The electrically-driven flow rate control valve according to claim 1, wherein the first flow rate adjusting mechanism and the second flow rate adjusting mechanism are located between the first fluid chamber and the switching mechanism, and between the second fluid chamber and the switching mechanism, respectively.

* * * * *